Jan. 11, 1966   R. FAVRE   3,229,178
ELECTRONIC MEANS FOR STABILISING THE
SPEED OF A TIME-PIECE MOTOR
Filed Nov. 20, 1962   2 Sheets-Sheet 1

United States Patent Office 3,229,178
Patented Jan. 11, 1966

1

3,229,178
ELECTRONIC MEANS FOR STABILISING THE SPEED OF A TIME-PIECE MOTOR
Robert Favre, Lausanne, Switzerland, assignor to Fabriques Movado, La Chaux-de-Fonds, Switzerland, a corporation of Switzerland
Filed Nov. 20, 1962, Ser. No. 239,404
Claims priority, application Switzerland, Nov. 20, 1961, 13,491/61
10 Claims. (Cl. 318—138)

This invention relates to a circuit or switching arrangement for stabilising the speed of revolution of an electric motor with the aid of a resonator, the driving member of the motor being controlled by a control member which emits signals with a frequency corresponding to the speed of revolution of the motor.

Motors of such types are already known, particularly for driving electric time-pieces. In known motors of this kind the rotor is controlled electro-dynamically by means of an electric circuit which employs, as a time base, a mechanical oscillator, for instance a spiral spring or a tuning-fork. Various attempts have also been made for stabilising the speed of rotation of such motors, for insance with the aid of a vibrating blade or of a tuning-fork, which is combined with a magnetic escapement co-operating with the rotor.

The aim of the present invention is to provide a stabilising device, which works with a resonator, and which works without any escapement devices co-operating with the rotor.

The switching arrangement according to the invention is characterised by the feature that the signals emitted by the control member of the motor are passed over the control member of the resonator, and that the resonator, upon a definite motor speed being reached, goes into resonance, and the voltages then occurring in the resonance circuit are superimposed upon the voltages in the motor circuit in such a way that any further acceleration of the motor is counteracted, and a constant speed of revolution is adjusted.

Figure 1:
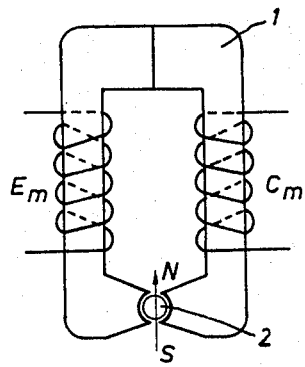
Figure 2:
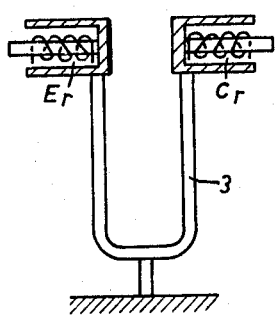
Figure 3:
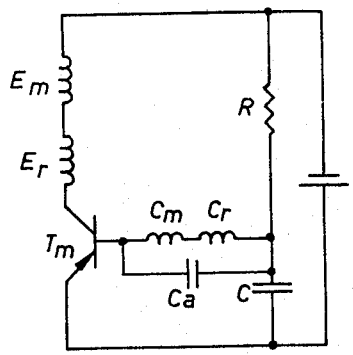
Figure 4:
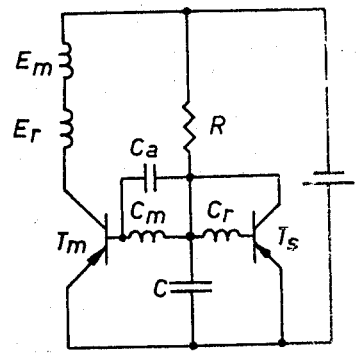
Figure 5:
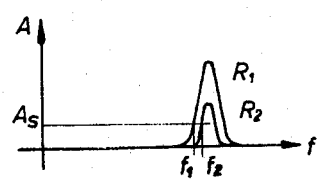

The invention is more fully explained with reference to the accompanying drawings, upon which are diagrammatically illustrated a constructional example of a motor and of a resonator, as well as various electric circuits. In these drawings:

FIGURE 1 shows a motor;
FIGURE 2 a resonator;
FIGURE 3 a circuit coupling together the motor and the resonator shown in FIGURES 1 and 2;
FIGURE 4 a modification of the circuit shown in FIGURE 3;
FIGURE 5, resonance curves illustrating the functioning of the resonator; and
FIGURES 6, 7 and 8, further modifications of the circuits of FIGURES 3 and 4.

The motor in FIGURE 1 consists of a stator 1, together with a rotor 2, rotatable in the air-gap between the stator poles, and formed of a diametrically magnetised permanent magnet, with a north pole N and a south pole S. The diameter of this rotor is very small, amounting for instance to only a few millimetres. In this way it is possible to obtain very high speeds of revolution with only a comparatively small absorption of power.

The stator 1 carries an exciter coil Em and a control coil Cm, located in the output circuit and in the input circuit respectively of a transistor amplifier. Various circuits of such transistor amplifiers are illustrated in FIGURES 3, 4, 6, 7 and 8.

The variation of the magnetic flux in the stator during the rotation of the rotor induces in the control coil Cm an alternating voltage, which is amplified in the amplify-

2 ing circuit mentioned and supplied to the exciter coil Em, which in its turn, with an alternating field, drives the rotor.

The resonator illustrated in FIGURE 2 consists of a tuning-fork 3, the vibrations of which are electronically maintained in the standard manner by means of a control coil Cr and a driving coil Er, the receiver coil Cr being located in the input circuit and the driving coil Er in the output circuit of a transistor amplifier, which, in the special case here under consideration, is identical with the transistor amplifier of the motor.

In the first constructional example of a circuit as in FIGURE 3, for coupling the motor and the resonator together in such a way that the speed of the motor is stabilised by the resonator, the control coils Cm of the motor and Cr of the resonator are connected in series in the input circuit of the transistor Tm, whilst the exciter coil Em of the motor and the driving coil Er of the resonator are arranged in series in the output circuit of the transistor Tm. A resistance R is connected in series with a condenser C, to a source of continuous current, one pole of which is connected to the emitter of the transistor Tm, the other pole being connected to the driving and exciting windings located in the collector circuit, whilst the timebase circuit opening between the resistance R and the condenser C is suitable pre-stressed by the resistance R. The coils of the motor are wound in such a way that an accelerating torque is imparted to the motor, whilst the coils of the resonator are wound in the opposite direction. Outside the range of resonance, the coils of the resonator constitute practically a short circuit, and have no effect. The motor is therefore accelerated up to a speed in the neighbourhood of the resonance frequency of the resonator. When the speed of the motor reaches a value corresponding to the resonance frequency of the resonator, the resonator vibrates in resonance, and the voltages then occurring, which counteract the voltages in the motor windings, prevent any further acceleration of the rotor, so that in this way the speed of the motor is maintained constant at an equilibrium speed.

It is furthermore advantageous to provide, in parallel with the control windings, a condenser Ca, which provides for the suppression of possible high-frequency vibrations resulting from inductive couplings.

By suitably laying out the control coil and the input resistances it is furthermore possible to excite harmonics of greater or smaller strength, and to stabilise the speed of the motor at a value corresponding to a sub-harmonic of the resonance frequency of the resonator, for instance to a speed corresponding to one-half or one-third of the resonance frequency.

It is furthermore possible to make the stabilised motor speed adjustable within certain limits, in such a way, for instance, that an increase in the frictional effects, owing to the ageing of the lubricating oil, is compensated for, by modifying the voltage across the control coil Cr of the resonator by changing its resistance. In FIGURE 5 the effect of such a change of resistance is illustrated. The diagrammatically indicated resonance curves correspond to two different resistances $R_1$ and $R_2$ of the control coil. It is known that with a change in the voltage amplitude A a slight change of the stabilising frequency is bound up, and that the frequency $f_2$ for a given value $A_s$ of amplitude of the stabilising for a weaker resonance amplitude is higher than the frequency $f_1$ for the stronger resonance amplitude.

FIGURE 4 shows a modification of the coupling circuit, which works with an additional synchronising transistor Ts, which is connected in parallel with the transistor Tm. In the time-base circuit of this transistor lies the control coil Cr of the resonator. When the resonator reaches its resonance frequency, the transistor Ts becomes periodically conductive, whereby the control current for the transistor Tm diminishes correspondingly. As in the first case described, this has the result that any further acceleration of the motor is counteracted.

Figure 6:
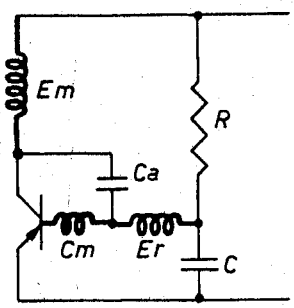
Figure 7:
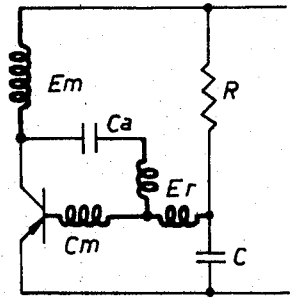
Figure 8:
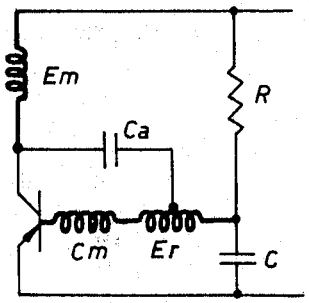

In FIGURES 6, 7 and 8, further modifications of the coupling circuit are illustrated, in which there is no separate control coil Cr for the resonator. The function of this control coil is taken over by the driving coil Er of the resonator. This arrangement permits a better utilisation of the available turns, and therefore an economical layout of the circuit. The driving coil Er of the resonator, in FIGURES 6, 7 and 8, is in the time-base circuit of the transistor.

In the circuit of FIGURE 6, moreover, the damping condenser Ca, which is connected in parallel with the control coil Cm of the motor and with the base collector stretch of the transistor, is employed for the excitation of the resonator winding Er. In case of resonance, the voltage occurring in the resonator winding Er then has such a phase position that the control voltage of the transistor is weakened, and in this way the speed of revolution is stabilised again.

In the circuit of FIGURE 7, part of the resonator coil Er lies in the parallel circuit of the condenser Ca; whilst in the circuit of FIGURE 8, this parallel circuit leads to a tapping of the resonator coil Er.

In a further modification, not shown, the single resonator coil Er may even be arranged in the collector circuit of the transistor. The electronic circuit described is of special importance for electric time-pieces, since the small dimensions of the rotor, the diameter of which is of the order of magnitude of millimetres, and its small weight of the order of magnitude of a milligramme, enable the absorption of power to be reduced to a few microwatts. Since moreover it is possible to stabilise the speed of the motor at a value which corresponds to a subharmonic of the resonance frequency of the resonator, this provides a convenient driving possibility for the hands of the time-piece. In addition to this, mechanical oscillators, such for example as tuning-forks or torsion oscillators, admit of being conveniently adopted in time-pieces.

This invention is however by no means restricted to time-pieces. On the contrary, the stabilising described admits of being applied to motors of any type, for instance to motors in electrical generator sets, to motors for driving recording and programming devices, to motors for gramophone record-players and so forth. Moreover, instead of a tuning-fork, as in the embodiment described and illustrated, other mechanical resonators may be employed, for instance vibrating blades or torsion oscillators. These mechanical resonators have the great advantage that on the one hand they are very stable, and on the other hand they have a comparatively low resonance frequency. Therefore although such mechanical resonators are preferably employed for stabilisation according to the invention, resonators of other types may also be adopted.

I claim:

1. An electronic motor comprising a motor having a rotor and a stator comprising a drive coil for driving said rotor and a control coil for developing a voltage output and applied to said drive coil, an amplifier connected to receive the output of said control coil and apply it to said drive coil, an electromechanical resonator driven by said control coil output for developing a second voltage output proportional to a resonant frequency of said resonator and connected to apply to said amplifier said second voltage in bucking relationship to the first mentioned voltage output to limit the speed of said rotor to a value proportional to said resonant frequency.

2. An electronic motor according to claim 1, including means to apply said second output voltage of said resonator as a harmonic of said resonant frequency of said resonator.

3. An electronic motor comprising a motor having a rotor and a stator comprising a drive coil for driving said rotor and a control coil for developing an output for controlling the speed of said rotor, an electromechanical resonator driven by said output of said control coil and having a resonant frequency, an amplifier connected to receive the output of said control coil and to amplify it and apply said output to said drive coil, and pickoff means connected to said resonator to develop a bucking voltage output proportional to said resonant frequency and to apply said voltage output in bucking relationship to the output of said control coil applied to said amplifier thereby to limit the speed of said motor to a value proportional to said resonant frequency.

4. An electronic motor according to claim 3, in which said electromechanical resonator comprises pickoff means for developing said bucking voltage connected in series with said control coil.

5. An electronic motor according to claim 3, in which said resonator comprises a coil connected to receive the control coil output and comprising said pickoff, means connecting the last mentioned coil to said control coil in series.

6. An electronic motor according to claim 3, including a second amplifier in parallel with the first mentioned amplifier connected to receive the control coil output and the bucking voltage output of said pickoff.

7. An electronic motor according to claim 3, including a capacitor in parallel with said motor control coil.

8. An electronic motor according to claim 3, in which said amplifier comprises a transistor having a base electrode, and in which said control coil is connected to said base, a capacitor connected to said drive coil and in parallel across said transistor base and said control coil.

9. An electronic motor according to claim 5, in which said pickoff means comprises a pickoff coil connected in series with said control coil, said pickoff coil having turns in parallel with said control coil, a capacitor in series with said turns, said amplifier comprising a transistor having a base electrode connected in series with said control coil, connections connecting said capacitor and said turns of said pickoff coil to said drive coil in parallel with said control coil across said control coil and said transistor base.

10. An electronic motor according to claim 3, in which said amplifier comprises a transistor having a base electrode, said pickoff comprises a pickoff coil for driving said resonator connected in series with said control coil, and a capacitor tapped to said pickoff coil in parallel with said control coil and said base and in series with said drive coil.

References Cited by the Examiner
UNITED STATES PATENTS

| | | | |
|---|---|---|---|
| 2,867,762 | 1/1959 | Lehman | 318—254 |
| 2,986,686 | 5/1961 | Clifford | 318—254 |
| 2,994,023 | 7/1961 | Devol | 318—254 X |
| 2,994,026 | 7/1961 | Sampietro | 318—254 X |

MILTON O. HIRSHFIELD, *Primary Examiner.*

ORIS L. RADER, *Examiner.*

C. E. ROHRER, G. Z. RUBINSON, *Assistant Examiners.*